July 2, 1963  A. JACOBSEN  3,095,916
GRID FOR DISINTEGRATING FIBROUS MATERIALS
Filed April 19, 1962
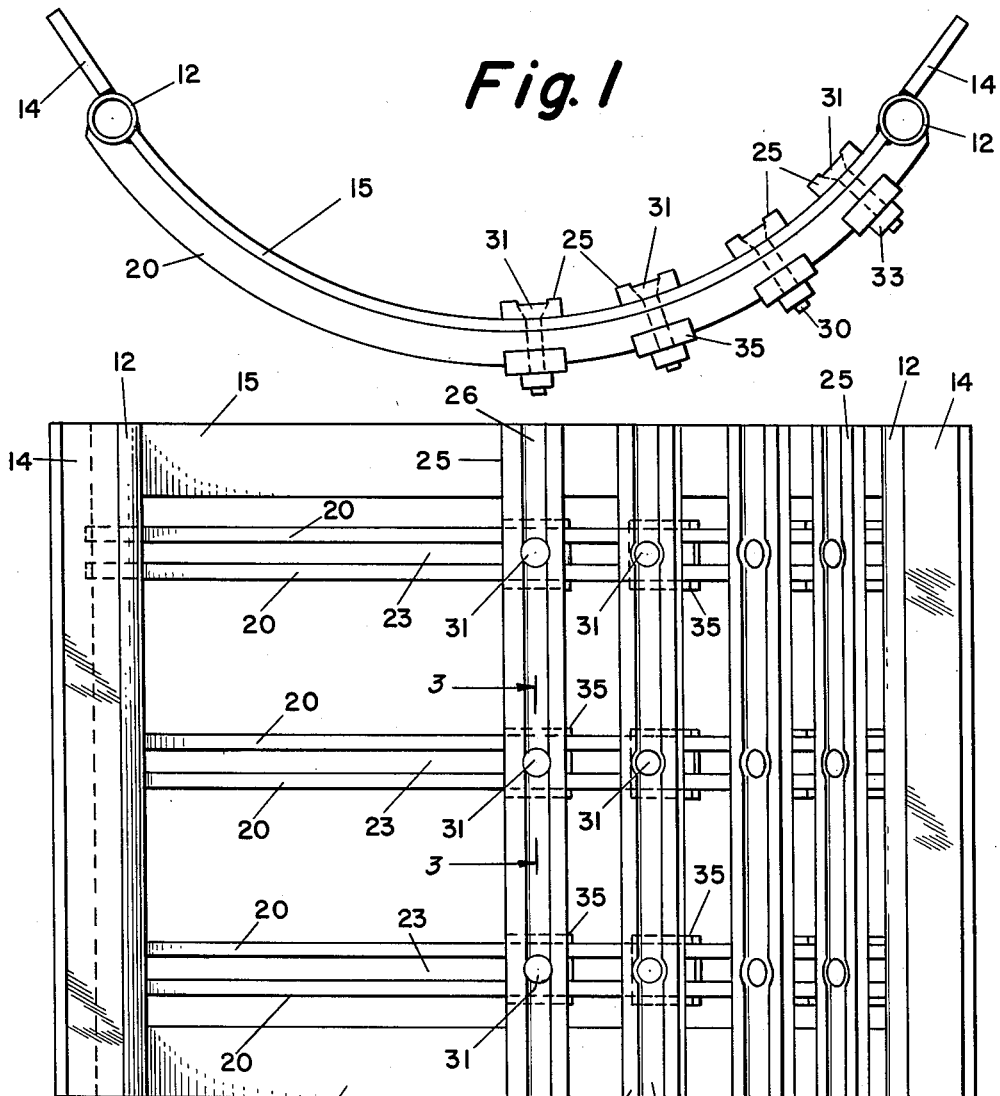
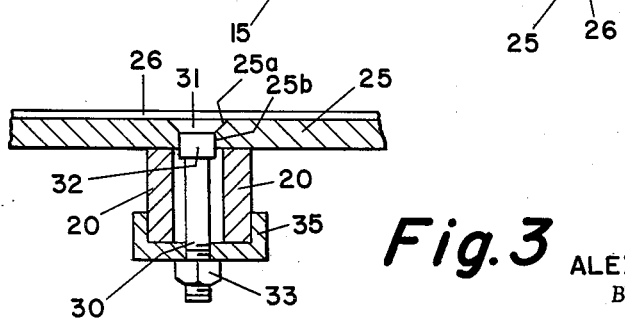
INVENTOR.
ALEXANDER JACOBSEN
BY
ATTORNEYS United States Patent Office 3,095,916
Patented July 2, 1963

3,095,916
GRID FOR DISINTEGRATING FIBROUS MATERIALS
Alexander Jacobsen, Appleton, Wis., assignor to Kools Brothers, Inc., Appleton, Wis., a corporation of Wisconsin
Filed Apr. 19, 1962, Ser. No. 188,792
7 Claims. (Cl. 146—117)

This invention relates to grid structure for disintegrating fibrous materials. More specifically, the invention relates to a universally adjustable grid construction for disintegrating forage and other similar fibrous materials to a suitable length or coarseness.

Previously, forage and the like has been cut by using a sheet metal grid or screen, bent to conform to the diameter of a coacting rotating cutter head, and containing a plurality of various size holes through which the fibrous material passes while being cut. The length or coarseness of the material to be cut was determined by the size screen used. As the material lodges in the screen holes it is cut by the knives attached to the cutter head arms so that the length of cut and flow of material is determined by the size of the screen holes.

It has also been previously proposed to use spaced bars to form a grid for supporting and cutting fibrous materials as described, for example, in U.S. Patent No. 1,286,757 December 3, 1918 and Patent No. 1,085,638 February 3, 1914. However, in such constructions the bars are rigidly fixed so that they cannot be individually replaced and also cannot be individually adjusted for controlling the length of the cut fibrous materials or for handling different types of materials to be disintegrated.

According to the present invention, a grid structure is provided in which an infinitely variable spacing of the individual bars is possible. Also the individual bars can be readily removed and replaced as desired. Other advantages and details of the invention will be apparent from the following specification and accompanying drawings, wherein FIGURE 1 is an elevational side view of a grid structure embodying the novel features of this invention, FIGURE 2 is a plan view of same, and FIGURE 3 is an enlarged sectional view taken on lines 3—3 of FIGURE 2.

Referring to the drawings, the grid structure comprises a frame member which is formed by two spaced convexly-shaped side members 15 rigidly connected to their ends by cross-members 12. The cross-members are preferably made of hollow metal tubes which are suitably welded to the ends of the side members, as shown in FIGURE 1. Flat extension plates 14 are suitably welded to the tubes. The plates 14 are positioned so as to align with the upper surface of the side members 15, as shown in FIGURE 1. A plurality of spaced concavely-shaped supporting metal bars 20 are suitably attached or welded to the lower surface of the spaced tubes 12, as shown in FIGURES 1 and 2. The bars 20 have a curvature which conforms with the curvature of side members 15, thereby forming a rigid cradle-shaped frame member.

A plurality of straight individual steel cutting or disintegrating bars 25 are provided of a length substantially the same as the distance between the spaced side members 15 so that the ends of the bars 25 are supported transversely on the side members 15, as shown in FIGURE 2. The bars 25 are grooved or milled lengthwise at their upper surface to provide a longitudinally extending channel 26 of suitable depth. The bars 25 are also provided at suitably spaced intervals located within the channels with countersunk conical drilled holes 25a which terminate in square punched holes 25b extending through the lower ends of the bars 25, as shown in FIGURE 3.

The holes in cutting bars 25 are spaced so as to be aligned with the open spaces 23 between the spaced bars 20, as shown in FIGURE 2.

In order to removably retain the bars 25 in suitably spaced position on the supporting bars 20, bolts 30 are provided which are threaded at their lower end portions and which have conical heads 31 and adjacent square shoulder portions 32 of suitable dimensions to be received, respectively, in mating complemental countersunk conical holes 25a and adjacent square holes 25b. It will be apparent that the square shoulder portions 32 will prevent rotation of the bolts within the holes in which they are positioned. The length of the bolts 30 is also sufficient so as to extend below the lower portions of supporting bars 20 and through removable U-shaped brackets 35 which embrace the lower portions of spaced bars 20, as shown in FIGURE 3. A threaded nut 33 is secured on the threaded lower end of bolt 30 so as to securely retain the cutting bars 25 in desired spaced position.

It will be apparent that the individual cutting bars 25 can be spaced apart from each other at any desired predetermined distance. The upper exposed surfaces and edges of the bars 25 serve to support any fibrous materials which may be fed thereon and also provide a cutting surface adapted to coact with suitable rotatable knives positioned adjacent the upper surfaces of the bars 25. The entire assembly as described can be suitably supported in a cutting machine by means of the spaced tubes 12 through which suitable supporting shafts can be inserted. The plates 14 also serve as supports as well as closures when positioned within a conventional cutting machine, as for example shown in U.S. Patent No. 944,780. The fibrous material which is disintegrated or cut can fall through the open spaces between the cuttings bars 25. It will also be obvious that the length of the cut fibrous materials will depend upon the distance between the spaced cutting bars 25 which can be readily adjusted as desired. The bars 25 can also be individually removed whenever necessary for replacement by new bars. The cutting bars 25 may also be variously spaced in different groups if desired, since they are universally adjustable by merely loosening the nuts 33 which retain the brackets 35, previously described. In FIGURE 2, the bars 25 are shown grouped at the right but it is to be understood that they may be uniformly spaced over the entire upper surface of supporting bars 20. The upper faces of the bars 25 provide a suitable supporting surface for cutting the fibrous material thereon. The heads 31 of bolts 30 being countersunk will not interfere with the action of cutting knives coacting with the upper surfaces of the bars 25.

In cutting some items of forage, a single cutting bar may be adequate. The bar may be positioned at any suitable location on the concavely-shaped supporting bars by suitable fastening means to immovably fix the cutting bar to the supporting bars and to permit selective change of position of the cutting bar on the supporting bars. The pairs of concavely-shaped supporting bars may also be replaced by an integral bar, such as a bar provided with a longitudinally extending slot or spaced openings for receiving the bolts therethrough.

It is to be understood that the specific description given is an illustrative embodiment of this invention and that the specific details herein described may be varied and such variations are intended to be included within the scope of the appended claims.

I claim:

1. A grid for disintegrating fibrous materials comprising a frame member; said frame member being formed by a pair of spaced concavely-shaped side members and end cross-members connecting the ends of said side members; a plurality of pairs of spaced concavely-shaped supporting bars connected to said cross-members, the bars of each pair of said supporting bars being spaced apart to provide an elongated open space therebetween; a plurality of suitably spaced transverse cuttings bars removably retained on said supporting bars; said cutting bars being provided with openings for receiving fastening bolts therethrough, the free ends of said bolts extending through the said elongated open space between the bars of each pair of supporting bars, and retaining means carried by the free ends of the bolts for securely retaining the cutting bars at preselected positions on said supporting bars.

2. A grid for disintegrating fibrous materials as defined in claim 1, wherein the end cross-members are hollow tubes.

3. A grid for disintegrating fibrous materials as defined in claim 1, wherein a flat extension plate is attached to each cross-member.

4. A grid for disintegrating fibrous materials as defined in claim 1, wherein the cutting bars are provided with spaced countersunk holes extending therethrough, bolts received in said holes, said bolts extending between the said spaced supporting bars and below the lower portions of said supporting bars, U-shaped clamps embracing the lower portions of said supporting bars, said clamps being provided with a hole for receiving the lower threaded end of said bolts and a nut threaded on the end of said bolt for securely retaining the clamps against the lower portions of said supporting bars.

5. A grid for disintegrating fibrous materials as defined in claim 4, wherein the cutting bars are provided with longitudinally extending channels at the upper surface thereof.

6. A grid for disintegrating fibrous materials as defined in claim 4, wherein the holes in the cutting bars are conically-shaped and countersunk at the upper portion thereof and square-shaped at the lower portion thereof, the upper head portion of the bolts being conically-shaped and the shoulder portion being square-shaped, said upper conical portion of the bolt being adapted to mate with the conically-shaped portion of the hole and the said square-shaped portion of the bolt being adapted to mate with the square-shaped portion of the hole to restrain rotation of the bolt within the hole.

7. A grid for disintegrating fibrous materials comprising a frame member; said frame member being formed by a pair of spaced concavely-shaped side members and end cross-members connecting the ends of said side members; a plurality of pairs of spaced concavely-shaped supporting bars connected to said cross-members, the bars of each pair of said supporting bars being spaced apart to provide an elongated open space therebetween; a cutting bar removably retained on said supporting bars, said cutting bar being provided with openings for receiving fastening bolts therethrough, the free ends of said bolts extending through the said elongated open space between the bars of each pair of supporting bars, and retaining means carried by the free ends of the bolts for securely retaining the cutting bar at preselected positions on said supporting bars.

References Cited in the file of this patent
UNITED STATES PATENTS

| | | |
|---|---|---|
| 1,286,757 | Patterson | Dec. 3, 1918 |
| 2,743,728 | Carlson | May 1, 1956 |

FOREIGN PATENTS

| | | |
|---|---|---|
| 23,319 | Germany | Aug. 30, 1883 |